Oct. 21, 1969     S. E. BIRO     3,473,403
REMOTE CONTROL FOR MULTIPLE RATIO VEHICLE DRIVELINES
Filed Dec. 12, 1967     4 Sheets-Sheet 1

INVENTOR:
Steven E. Biro
BY John A. Faulkner
and Donald J. Harrington
ATTORNEYS.

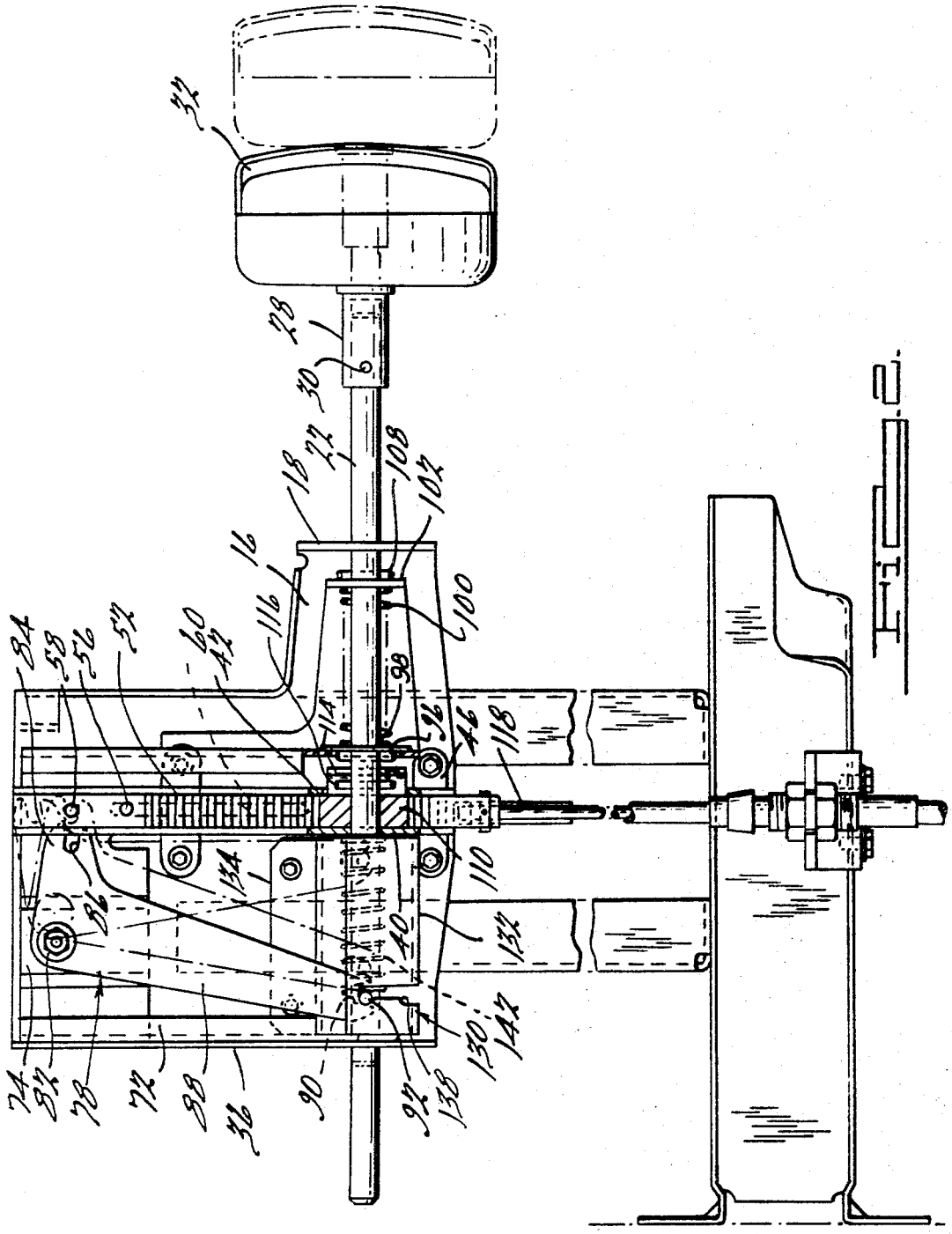

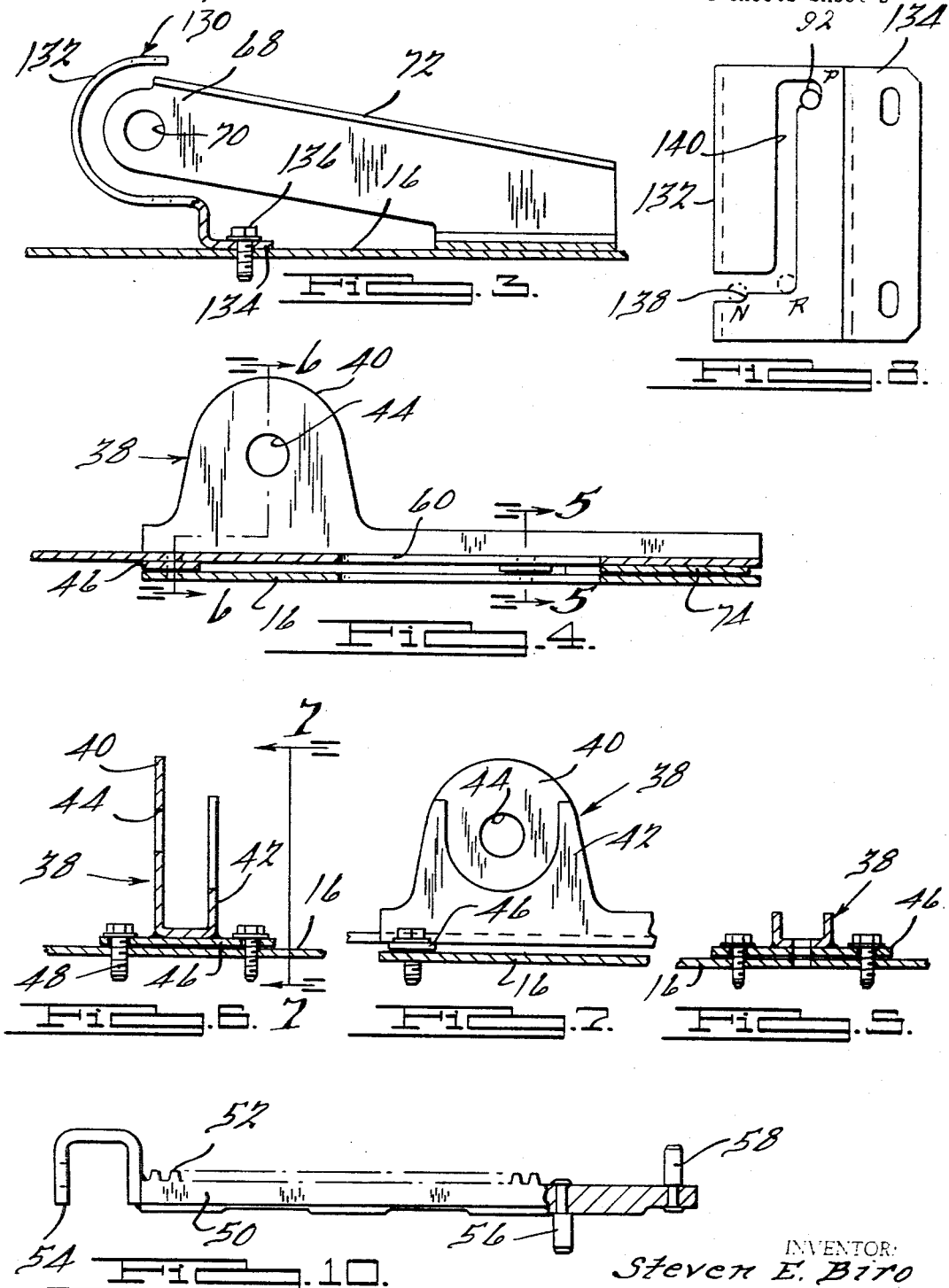

Oct. 21, 1969  S. E. BIRO  3,473,403
REMOTE CONTROL FOR MULTIPLE RATIO VEHICLE DRIVELINES
Filed Dec. 12, 1967  4 Sheets-Sheet 4
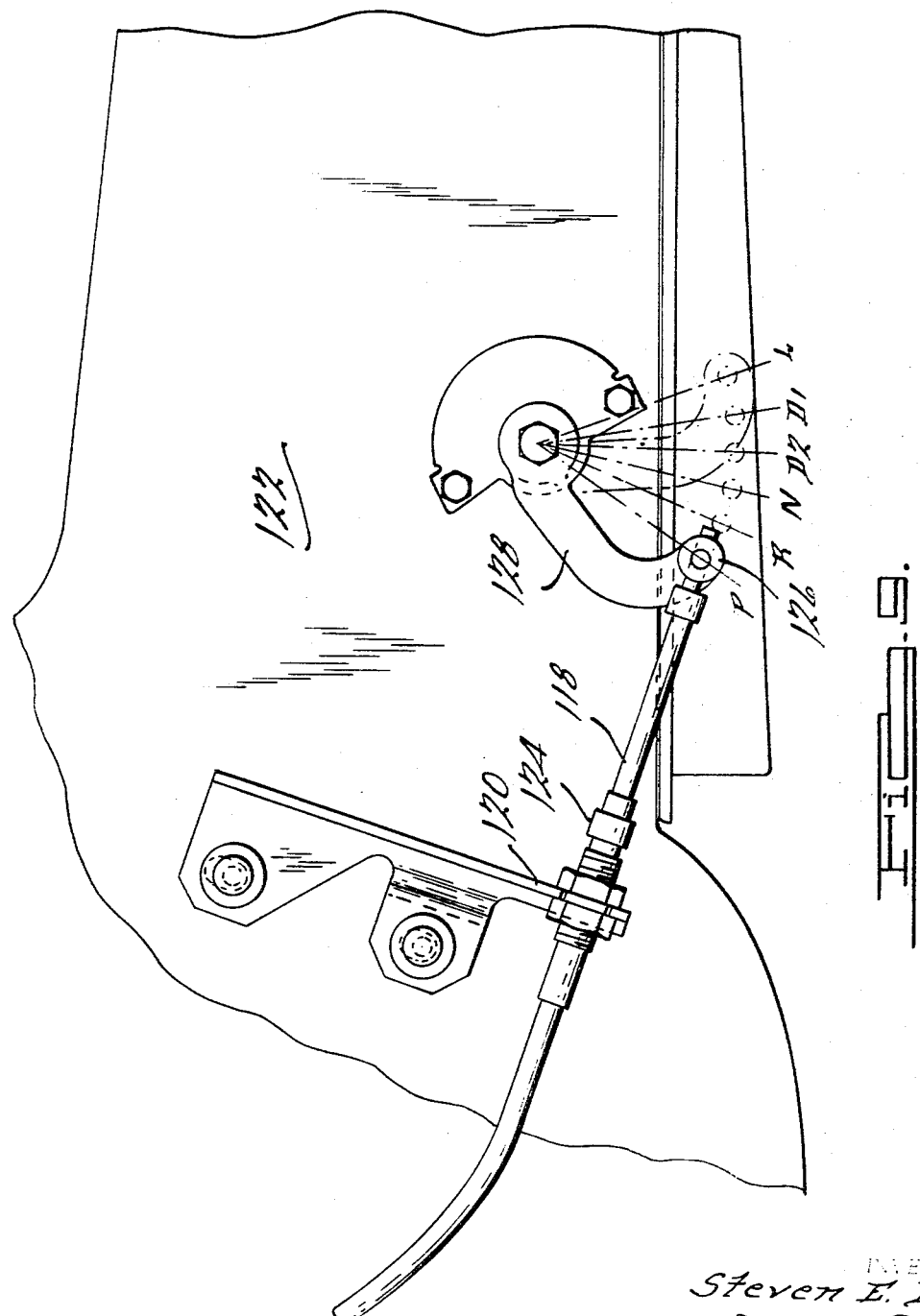

United States Patent Office 3,473,403
Patented Oct. 21, 1969

3,473,403
REMOTE CONTROL FOR MULTIPLE RATIO
VEHICLE DRIVELINES
Steven E. Biro, Detroit, Mich., assignor to Ford Motor
Company, Dearborn, Mich., a corporation of Delaware
Filed Dec. 12, 1967, Ser. No. 690,018
Int. Cl. G05g 9/12, 1/02; F16c 1/12
U.S. Cl. 74—473        6 Claims

ABSTRACT OF THE DISCLOSURE

A remote control mechanism for positioning a ratio controlling element of a multiple-ratio power transmission mechanism in an automotive vehicle driveline. The mechanism comprises a driver-controlled lever that can be rotated for ratio selection and which may be pulled and pushed to engage and disengage a brake pawl for the parking brake of the transmission mechanism. In this way, the mechanical advantage necessary for controlling the pawl can be increased to reduce the manual effort on the selector shaft.

General description of the invention

My invention is adapted especially to be used in automotive vehicle drivelines that employ multiple-ratio, automatic transmissions of the type now in common use. These include planetary gear elements, the relative motion of which is controlled by fluid pressure operated clutch or brake servos. Ratio changes are accomplished automatically, but the shift pattern that is obtained can be selected by the vehicle operator as he shifts a so-called range selector valve that forms a part of the automatic control valve system. The selector valve is connected mechanically to a driver-controlled shift lever located within the vehicle passenger compartment.

It is common practice in environments of this type to mount the driver-operated shift lever on the vehicle steering shaft. By appropriately adjusting the shift lever the operator can shift the selector valve to its various drive range positions, such as the low speed range position in which the transmission is conditioned for continuous operation in the lowest speed ratio or one or more forward drive positions in which automatic ratio changes can be obtained. There also is a reverse drive position and a park position.

In automatic power transmission mechanisms of conventional design the driven shaft may be braked to the stationary housing by a parking pawl and parking gear. The parking pawl is moved into engagement and out of engagement with respect to the gear by means of a mechanical linkage which connects it directly to the manual valve. As the vehicle operator shifts the manual valve to the park position, the parking pawl engages its associated gear as the valve body is conditioned for neutral operation.

The shifting effort required to adjust the manual valve to the various drive range positions is relatively slight, but the force necessary to shift the manual valve into and out of the park position often is undesirably high because of the loads that are imposed upon the parking pawl.

I have removed the driver-operated ratio shift control lever in my invention from the steering column and have adapted it for mounting in any convenient location within the vehicle passenger compartment. The same control element that is used to impart shifting movement to the manual valve is used also to operate the parking pawl linkage. I have made provision, however, for increasing the mechanical advantage of the system during movement of the parking pawl into and out of the parking position, thereby avoiding the undesirably high shifting efforts that accompany conventional shift linkage mechanisms.

I have made provision also for obtaining ratio adjustments of the manual valve by a simple twisting movement of the control member. In contrast, the shift levers of conventional systems require arcuate movement of the control lever through a relatively wide arc as it pivots about the axis of the steering column. Movement of the driver-operated lever of my invention into and out of the park position is achieved by pulling and pushing the lever. This lever is isolated from and independent of the linkage system for the drive range selection, the latter being controlled with a twisting movement.

Brief description of the figures of the drawing

FIGURE 2 is a plan view of the structure of FIGURE 1.

FIGURE 3 is a transverse cross-sectional view of a portion of the structure of FIGURE 1.

FIGURE 4 is a transverse cross-sectional view taken along a plane parallel to the plane of the sectional view of FIGURE 3.

FIGURE 5 is a cross-sectional view taken along the plane of section line 5—5 of FIGURE 4.

FIGURE 6 is a cross-sectional view taken along the plane of section line 6—6 of FIGURE 4.

FIGURE 7 is an end view of the structure of FIGURE 6 as seen from the plane of section line 7—7 of FIGURE 6.

FIGURE 8 is a bottom view of the gate mechanism shown in FIGURE 3.

FIGURE 9 is a partial elevation view of the side of an automatic transmission housing with a control lever that is actuated by the structure of FIGURE 1

Particular description of the invention

Figure 1:
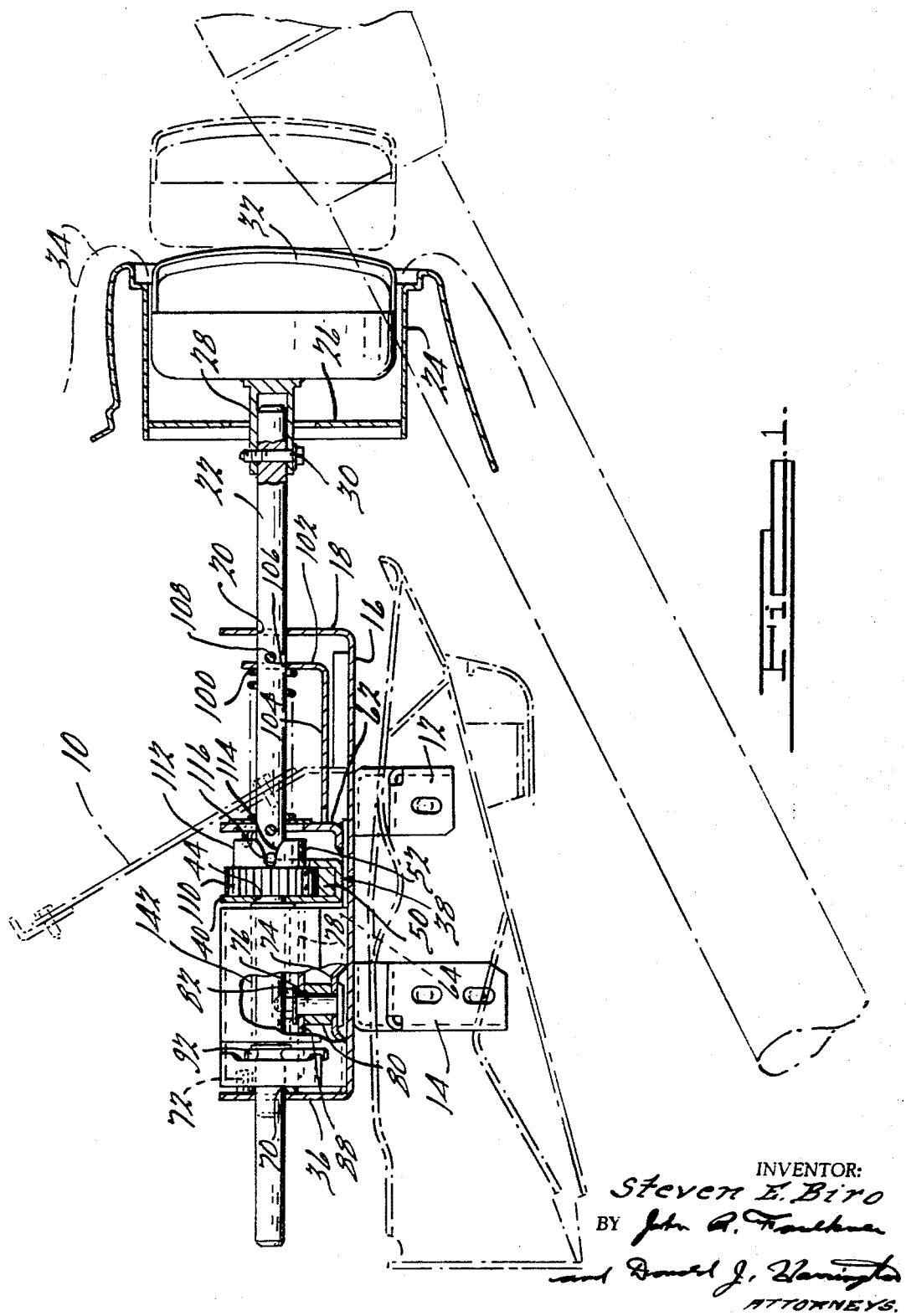
FIGURE 1 shows in longitudinal cross-sectional form an assembly view of my improved linkage system.

The forward end of the vehicle passenger compartment has mounted in transverse disposition a vehicle dash structure which forms a part of the vehicle chassis. The dash, which is shown in part at 10, is secured to other chassis components by several brackets as indicated at 12 and 14. An extension of the dash structure 10, as seen at 16, is formed with an upright wall 18 which is provided with an opening 20 through which a control shaft 22 extends. At the right-hand end of the control shaft 22 there is mounted a handle 24 which may be gripped by the vehicle operator.

Handle 24 comprises a hub 26 with a central opening that receives a flanged sleeve 28. This sleeve is received over the end of shaft 22 and is pinned in place by screw 30. A hand grip portion 32 of the handle is secured to sleeve 28 and extends from one side of the hub 26 to the other so that the operator may conveniently twist the shaft 22. The handle 26 is housed within cushioning padding 34 which surrounds the dash structure. The structure 16 is in the form of a channel with a rearward wall 36.

Secured to the upper surface of the support 16 is a gear rack supporting channel of generally U-shape as indicated at 38 in FIGURES 1, 2 and 6. It is comprised of a first leg 40 and a second leg 42. The leg 40 is apertured at 44 to receive the shaft 22. The base of the channel 38 is welded to a plate 46 which in turn is bolted by bolts 48 to the support 16.

The right-hand side of the channel structure as seen in FIGURES 4 and 5 has legs that are substantially equal in height. Slidably mounted in the channel 38 is a gear rack as indicated in FIGURES 1 and 10, the upper surface of which is formed with rack teeth 52. The left-hand end of the rack body 50 carries a bracket 54 to which is connected a push-pull cable as will be described subsequently.

The right-hand end of the body 50 is formed with a vertical opening which receives a guide pin 56. An actuator pin 58 is carried by the right-hand of the rack body 50 as indicated best in FIGURE 10.

Pin 56 is mounted slidably in a slot 60 formed in the lower surface of the member 16. This slot and pin limits the extent of sliding movement of the rack with respect to the channel 38.

Situated within the member 16 is a movable carriage 62 which has a base 64 that is slidably positioned on top of the lower plate of the member 16. The channel 38 is raised from the surface of the lower plate of member 16 as indicated in FIGURE 4. The plate 46 acts as a spacer for this purpose. The base 64 of the carriage 62 is adapted to slide between the channel 38 and the lower plate of the member 16 as indicated best in FIGURE 4.

The left-hand end of the carriage 62 forms a wall 68 that extends from the upper region of the figure view to the lower region thereof. It includes an opening 70 through which shaft 22 extends. The wall 68 forms a support for the shaft 22. Joined to the wall 68 is a shroud 72 which provides structural rigidity to the carriage 62.

As indicated best in FIGURE 1, the base 64 of the carriage 62 is formed with a boss 74 which provides support for a mounting pin 76. Journaled for oscillation on the pin 76 is a bell crank lever 78. The lever 78 is adapted for oscillation about the axis of the pin 76 in a plane that is parallel to the plane of the base 64. A suitable spacer 80 establishes the operating height of the lever 78. The lever is secured in place by a threaded stem and nut 82.

Lever 78 includes an arm 84 which is formed with two teeth or clutch elements at its outermost extremity. These define a tooth space 86 which is adapted to register with the pin or clutch element 58 when the arm 84 is rotated about its pin 76 in a counterclockwise direction as viewed in FIGURE 2. It may be brought into registry with the pin 58 when the carriage 62 is shifted in a right-hand direction as viewed in FIGURE 1.

A second arm 88 of the bell crank lever 78 is provided at its end with a pair of teeth which define a tooth space 90. This space is adapted to register with a pin 92 which is received through an opening in the shaft 22 and held therein in transverse relationship as indicated best in FIGURE 1.

Shaft 22 carries also a pin 96 which engages washer 98. A pre-loaded compression spring 100 is situated between washer 98 and a wall 102 carried by an extension 104 of the carriage 62. Wall 102 is formed with an opening 106 through which the shaft 22 extends. Displacement of the shaft 22 in a left-hand direction with respect to the wall 102 is limited by a cross pin 108.

Upon shifting movement of the carriage 62, the tooth space 86 is brought into registry and out of registry with with respect to the pin 58.

Journaled rotatably on the shaft 22 is a gear 110 which preferably is a non-metallic spur gear. As best seen in FIGURES 1 and 10, it is formed with gear teeth that engage the rack teeth 52. Gear 110 is formed also with a boss 112 which is slotted at 114 to reecive pin 116. The pin is carried in a transverse opening in the shaft 22. When the shaft 22 is shifted in a right-hand direction, as viewed in FIGURE 1, the pin 116 moves out of registry with respect to the slot 114 thereby disconnecting the gear 110 from the shaft 22. When the pin is pushed, as shown in FIGURE 1, gear 110 will rotate upon rotation of the shaft 22.

The rack body 50, by means of the bracket 54, is connected to a push-pull cable shown in part in FIGURE 2 at 118. This may be a flexible steel cable with a plastic lining to reduce friction. It is extended, as indicated schematically in FIGURE 9, to the lower region of the driveline where it is supported by siutable bracket structure 120 secured to one side of the transmission housing. The transmission is shown in elevation in FIGURE 9 at 122.

The bracket 120 carries sleeve 124 through which the cable 118 extends. The end of the cable is secured, as shown at 126, to the extended end of a control arm 128. This in turn is connected by means of a suitable mechanical linkage to the previously described manual valve for the automatic transmission.

The various operating positions for the control arm 128 are indicated in FIGURE 9 at P, R, N, D2, D1 and L. These respectively correspond to the park position, the reverse position, the neutral position, the automatic drive range position, the intermediate drive position and the low speed ratio drive position.

Supported on the member 16, as indicated best in FIGURES 1, 2 and 3, is a gate plate 130. This includes a rounded drum section 132 and a pedestal portion 134. Portion 134 is bolted by bolts 136 to the base of the member 16. As seen best in FIGURE 8, the circular section 132 is formed with cammed surfaces which are engaged by the pin 92. When pin 92 is in the neutral position, it is engaged by a shoulder 138. The shaft 22 must be pulled by the vehicle operator to permit the pin 92 to ride over the shoulder 138 from the neutral position indicated in FIGURE 8 to the reverse position.

The D2 and D1 positions indicated in FIGURE 9 are in the same plane as the end position shown in FIGURE 8. Thus no resistance is encountered by the operator as he shifts the shaft from the neutral position to either the D2 position or the D1 position. To effect a shifting movement of the pin 92 to the low speed position L, it is necessary to move the pin 92 over another shoulder formed in the gate structure of FIGURE 8 which is similar in form to the shoulder 138 indicated.

The gate mechanism of FIGURE 8 includes also an elongated slot 140 through which the pin 92 moves as the vehicle operator pulls the shaft 92 from the reverse position shown to the park position. Before the operator can shift to the park position, it is necessary for the rack body 50 to move so that it is in axial alignment with the tooth space shown in FIGURE 2 at 86. It is at that time that the pin 92 is in the reverse position R indicated in FIGURE 8. As the vehicle operator pulls the shaft 22, the carriage 62 will shift thereby causing the pin 58 to register with the opening 86. Continued movement of the shaft with respect to the carriage 62 after the lost motion permitted by the space between wall 102 and wall 18 is taken up will cause the bell crank lever 78 to rotate in a counterclockwise direction as viewed in FIGURE 2. This will cause the rack body 50 to be shifted thereby actuating the cable 118. This in turn will cause the control arm 128 to move in the reverse position shown in FIGURE 9 to the park position shown in FIGURE 9.

The pin 92 is held normally in engagement with the cam surfaces on the gate mechanism by means of a spring 142 which is anchored against the leg 40 of the channel 38. Resistance to movement of the shaft 22 to the park position is provided by the spring 142 as well as by spring 100.

To retract the control lever 128 from the park position, it is necessary for the operator to push the handle 24 in a forward direction into the dash structure. This then will cause the bell crank lever 78 to oscillate in a clockwise direction and the rack body 50 then is returned to the position corresponding to reverse drive. At that time the carriage 62 is shifted away from the wall 18 and this then results in shifting movement of the lever 78 to the inoperative position as the pin 58 moves out of registry with the opening 84. Thereafter the rack body can be shifted upon rotation of the shaft 22 by the operator to any one of the drive range positions desired. The rotary motion of the shaft 22 is translated to a reciprocating motion of the rack body 50 which in turn results in appropriate adjustments of the control cable 118.

After the pin 92 is moved to the park position, the shaft 22 can be rotated slightly so that it will be offset from the groove 140 in the lock position shown in FIGURE 8.

The parking brake then is locked in place until it is manually shifted by the operator.

Having thus described a preferred form of my invention, what I claim and desire to secure by U.S. Letters Patent is:

1. A remote control for obtaining ratio adjustments for an automatic power transmission mechanism in a vehicle driveline including a ratio control arm, said driveline being mounted within a vehicle chassis structure, a driver-operated control shaft, means for mounting said control shaft for both reciprocating and rotary motion in a dash portion of said vehicle chassis structure, a grip portion on said shaft being adapted to be gripped by the vehicle operator to cause rotation of said shaft and reciprocating motion thereof, a gear drivably connected to said shaft, a gear rack engaged with said gear, mounting structure supporting said rack for reciprocating motion, a flexible cable connection between said rack and said control arm, a carriage mounted on said structure adjacent said rack, a lever pivoted on said carriage at a location intermediate its ends, one end of said lever being connected mechanically to said shaft, the other end of said lever and said rack including engageable portions, a connection between said carriage and said shaft whereby the former may be shifted in the direction of the axis of said shaft as said shaft is adjusted axially by the operator, movement of the shaft in one direction establishing innerlocking engagement of said other lever end and said rack whereby said rack is shifted upon continued movement of said shaft in the same direction of motion thereby adjusting said control arm to one limiting position.

2. A remote control for obtaining ratio adjustments for a geared power transmission mechanism in an automotive vehicle driveline including a ratio control arm, said driveline being mounted within a vehicle chassis structure, a driver-operated control shaft, means for mounting said control shaft for both reciprocating and rotary motion in a dash portion of said vehicle chassis structure, a grip portion on said shaft being adapted to be gripped by the vehicle operator to cause rotation of said shaft and reciprocating motion thereof, a gear, a gear rack engaged with said gear, mounting structure supporting said rack for reciprocating motion, a disengageable connection between said shaft and said gear, a flexible cable connection between said rack and said control arm, a carriage mounted on said structure adjacent said rack, means for selectively connecting said carriage and said rack, a connection between said carriage and said shaft whereby the former may be shifted in the direction of the axis of said shaft as said shaft is adjusted axially by the operator, movement of the shaft in one direction causing movement of said rack thereby causing adjustment of said control arm to one limiting position disestablishing the aforesaid connection between said gear and said shaft, said rack being adjusted to each of several operating positions upon rotation of said shaft by said vehicle operator as said gear meshes with said rack.

3. The combination as set forth in claim 1 wherein the connection between said gear and said shaft comprises innerlocking clutch elements, said clutch elements being engaged when said shaft assumes one axial position and being disengaged when it assumes another axial position, said lever being moved to an inoperative position when said clutch elements are engaged whereby said rack may be moved independently of said lever as said shaft is rotated.

4. The combination as set forth in claim 2 wherein the connection between said gear and said shaft comprises innerlocking clutch elements, said clutch elements being engaged when said shaft assumes one axial position and being disengaged when it assumes another axial position, said carriage and rack connecting means being moved to an inoperative position when said clutch elements are engaged whereby said rack may be moved independently of said lever as said shaft is rotated.

5. The combination as set forth in claim 3 wherein the connection between said shaft and said carriage is a spring connection with a preloaded spring anchored on said shaft and engaging said carriage, said carriage being shiftable in the direction of the axis of said shaft to effect a mechanical connection between said rack and said other lever end and said spring connection yielding to permit adjustment of said lever upon continued movement of said shaft beyond the position in which said rack is engaged by said other lever end.

6. The combination as set forth in claim 4 wherein the connection between said shaft and said carriage is a spring connection with a preloaded spring anchored on said shaft and engaging said carriage, said spring connection yielding to permit disengagement of said connection between said gear and said shaft.

References Cited

UNITED STATES PATENTS

| | | | |
|---|---|---|---|
| 2,826,929 | 3/1958 | Lincoln et al. | 74—473 |
| 2,912,873 | 11/1959 | Little | 74—501 X |
| 3,275,029 | 9/1966 | Wellman | 74—502 X |

MILTON KAUFMAN, Primary Examiner

U.S. Cl. X.R.

74—502, 503, 504